United States Patent
Trudsoe

(10) Patent No.: US 9,499,640 B2
(45) Date of Patent: Nov. 22, 2016

(54) PRESERVATION OF BIOMASS MATERIAL COMPRISING POLYSACCHARIDE AND METHOD FOR EXTRACTING POLYSACCHARIDE FROM PRESERVED BIOMASS MATERIAL

(75) Inventor: Jens Eskil Trudsoe, Roskilde (DK)

(73) Assignee: CP Kelco ApS, Lille Skensved (DK)

( * ) Notice: Subject to any disclaimer, the term of this patent is extended or adjusted under 35 U.S.C. 154(b) by 1009 days.

(21) Appl. No.: 13/315,474

(22) Filed: Dec. 9, 2011

(65) Prior Publication Data

US 2012/0186580 A1 Jul. 26, 2012

Related U.S. Application Data

(60) Provisional application No. 61/435,104, filed on Jan. 21, 2011.

(51) Int. Cl.
 C08B 37/00 (2006.01)
 A23L 3/349 (2006.01)
 A23L 3/3463 (2006.01)

(52) U.S. Cl.
 CPC ............ C08B 37/0045 (2013.01); A23L 3/349 (2013.01); A23L 3/3463 (2013.01); C08B 37/0003 (2013.01)

(58) Field of Classification Search
 CPC .................................................. C08B 37/0003
 See application file for complete search history.

(56) References Cited

U.S. PATENT DOCUMENTS

| | | | |
|---|---|---|---|
| 1,497,884 A | 8/1923 | Jameson | |
| 1,654,131 A * | 12/1927 | Leo .................................. | 536/2 |
| 2,022,471 A | 11/1935 | Leo et al. | |
| 2,387,635 A | 2/1945 | Bailey | |
| 2,727,033 A | 12/1955 | Norman et al. | |
| 4,001,458 A | 1/1977 | Morolo | |
| 4,119,435 A | 10/1978 | Nakao et al. | |
| 4,435,437 A | 3/1984 | Ziegler | |
| 4,451,489 A | 5/1984 | Beale et al. | |
| 4,497,838 A | 2/1985 | Bonnell | |
| 4,497,842 A | 2/1985 | Ehrlich et al. | |
| 4,508,747 A | 4/1985 | Ziegler | |
| 4,526,794 A | 7/1985 | Altomare et al. | |
| 4,781,936 A | 11/1988 | Nafisi-Movaghar | |
| 4,895,938 A | 1/1990 | Teraoka et al. | |
| 5,064,675 A | 11/1991 | Jensen et al. | |
| 5,275,834 A | 1/1994 | Thibault et al. | |
| 5,416,206 A | 5/1995 | Nagura et al. | |
| 5,792,461 A | 8/1998 | Bok et al. | |
| 5,820,915 A | 10/1998 | Harris | |
| 5,863,593 A | 1/1999 | Juarez | |
| 5,962,044 A | 10/1999 | Harris | |
| 5,962,756 A | 10/1999 | Koch et al. | |
| 6,183,806 B1 | 2/2001 | Ficca et al. | |
| 6,482,942 B1 | 11/2002 | Vittori | |
| 6,528,099 B1 | 3/2003 | Garti et al. | |
| 6,787,177 B1 | 9/2004 | Crandall et al. | |
| 7,138,152 B2 | 11/2006 | Allen et al. | |
| 7,166,315 B2 | 1/2007 | Hartal et al. | |
| 7,235,275 B2 | 6/2007 | Kotach et al. | |
| 7,527,820 B2 | 5/2009 | Allen et al. | |
| 2003/0166608 A1 | 9/2003 | Pongsamart | |
| 2004/0131748 A1 | 7/2004 | Allen et al. | |
| 2005/0113730 A1 | 5/2005 | Runeman et al. | |
| 2006/0099302 A1 | 5/2006 | Christensen | |
| 2009/0176286 A1 | 7/2009 | O'Connor et al. | |

FOREIGN PATENT DOCUMENTS

| | | | |
|---|---|---|---|
| CN | 101875703 A | 11/2010 | |
| EP | 0514890 A2 | 11/1992 | |
| EP | 0761692 A2 | 12/1997 | |
| FR | 2832027 A1 | 5/2003 | |
| GB | 453877 A | 9/1936 | |
| GB | 1332985 A | 10/1973 | |
| NL | EP 0958749 A1 * | 11/1999 | ............... A23K 3/00 |
| WO | 9948382 A1 | 9/1999 | |
| WO | 0138400 A2 | 5/2001 | |
| WO | 03003818 A2 | 1/2003 | |
| WO | 2004020472 A2 | 3/2004 | |
| WO | 2007120210 A2 | 10/2007 | |

OTHER PUBLICATIONS

Itavo et al, Replacement of Corn Silage by Orange Peel Silage in the Feeding of Dairy Cows.Intake, Milk Production and Composition, 2000, Rev. bras. zootec., 29(5):1498-1503.*
International Search Report of PCT/EP2010/059766 mailed Oct. 20, 2010.
Written Opinion of the International Searching Authority of PCT/EP2010/059766 mailed Oct. 20, 2010.
Office Action U.S. Appl. No. 12/510,478 mailed Mar. 14, 2012.
International Search Report of PCT/EP/2011/073934 mailed Apr. 17, 2012.
Written Opinion of the International Searching Authority of PCT/EP/2011/073934 mailed Apr. 17, 2012.
Yuen, C.M.C., et al., "Effects of ethanol, acetaldehyde and ethyl formate vapour on the growth of Penicillium italicum and P. digitatum on oranges," Journal of Horticultural Science 70 (1), pp. 81-84 (1995).

\* cited by examiner

*Primary Examiner* — Melvin C Mayes
*Assistant Examiner* — Stefanie Cohen
(74) *Attorney, Agent, or Firm* — Sutherland Asbill & Brennan LLP

(57) ABSTRACT

A process for preserving biomass material comprising polysaccharide, the process comprising contacting the biomass material with a preserving composition comprising alcohol to form a preserved biomass material and storing the preserved biomass material for at least 24 hours. At least a substantial amount of the polysaccharide may be extracted from the preserved biomass material with yields comparable to or improved over extraction from fresh non-preserved biomass material.

37 Claims, No Drawings

PRESERVATION OF BIOMASS MATERIAL COMPRISING POLYSACCHARIDE AND METHOD FOR EXTRACTING POLYSACCHARIDE FROM PRESERVED BIOMASS MATERIAL

RELATED APPLICATIONS

This application claims priority under 35 U.S.C. §119(e) to U.S. Provisional Application 61/435,104 filed on Jan. 21, 2011, the disclosure of which is expressly incorporated by reference in its entirety.

TECHNICAL FIELD

This invention relates to polysaccharide materials and more particularly relates to preservation of biomass material for storage and later use such as for extraction of polysaccharide.

BACKGROUND OF THE INVENTION

Polysaccharides such as pectin and carrageenan are useful as colloidals in many applications including, but not limited to food preparation. Polysaccharides can be extracted from biomass materials containing polysaccharides and such biomass materials may include citrus fruit peel, apple pomace, sugar beet residue from sugar production, sunflower residue from oil extraction, potato residue from starch extraction from potatoes, red seaweed and brown seaweed, and the like.

Some biomass materials contain juice, essential oil, sugar, water, or combinations thereof. Often, materials such as juice, essential oils, and sugar are removed or extracted from the biomass material and the pectin is then extracted from the remaining biomass material. Such biomass material such as fresh citrus peel may contain pectinases, particularly pectin methyl esterase and polygalacturonase, which starts to de-esterify and depolymerised pectin in the fresh peel, respectively. This leads to pectin having a lower degree of esterification and a lower molecular weight over time, for instance during the time where the fresh peel is transported between juicing and drying or extraction.

Prior approaches to treating polysaccharide containing biomass materials are relatively complex or ineffective or result in biomass that is hazardous to transport. Consequently, there is a need for a more safe and simple, yet effective polysaccharide-containing biomass preservation method.

BRIEF SUMMARY OF THE INVENTION

This invention addresses one or more of the above-described needs by providing a process for preserving biomass material comprising polysaccharide, the process comprising contacting the biomass material with a preserving composition comprising alcohol to form a preserved biomass material and storing the preserved biomass material for at least 24 hours.

Without wishing to be bound by theory, the alcohol in the preserving composition appears to reduce microbial and enzymatic activity in the biomass material.

According to another aspect of the present invention, a process for extracting polysaccharide from biomass material comprises contacting the biomass material with a preserving composition comprising an alcohol to form a preserved biomass material, storing the preserved biomass material for at least 24 hours, and thereafter extracting at least a substantial portion of the polysaccharide from the preserved biomass material.

Embodiments of this invention are set forth below in the following detailed description and claims.

DETAILED DESCRIPTION OF EMBODIMENTS

As summarized herein above, this invention encompasses a method for preserving biomass material comprising polysaccharide and a method for extracting polysaccharide from preserved biomass material. Several embodiments of this invention are described below and parameters of different steps, components and products of embodiments are described separately, but may be combined consistently with this description and claims to enable still other embodiments as will be understood by those skilled in the art.

According to embodiments of this invention, biomass material comprising a polysaccharide is contacted with a preserving composition comprising alcohol to form a preserved biomass material. The preserved biomass material can then be stored for at least 24 hours or more as will be explained in more detail with regard to certain embodiments. Without wishing to be bound by theory, the alcohol in the preserving composition appears to reduce microbial and enzymatic activity in the biomass material. At least a substantial portion of the polysaccharide in the preserved biomass material may then be extracted and the resulting extracted polysaccharide has properties comparable or even superior to polysaccharide extracted from fresh, non-preserved biomass material.

Suitable biomass materials comprising polysaccharide (hereinafter "biomass material") include, but are not limited to citrus fruit peel, apple pomace, sugar beet residue from sugar extraction, sunflower residue from oil extraction, potato residue from starch production, and other biomass materials comprising pectin. In addition, other suitable biomass materials for embodiments of this invention include, but are not limited to red seaweed comprising carrageenan and agar, and brown seaweed comprising alginate.

According to certain embodiments of the present invention, suitable biomass material includes citrus fruit peel, such as, but not limited to orange peel, lemon peel, lime peel, and grapefruit peel.

Before preserving in accordance with embodiments of this invention, the biomass material may be subject to an extraction process to extract one or more components other than polysaccharide from the biomass material, such as juice and essential oils from citrus fruit, sugar from sugar beets, sunflower oils from sunflower seeds, apple juice from apple fruit, and starch from potatoes. Furthermore, citrus peel may be subjected to aqueous washing for removal of sugar from the peel.

Also, according to certain embodiments of the present invention, suitable biomass material is fresh when contacted with the preserving composition. Fresh biomass material means biomass material that was recently harvested or subjected to an extraction process for other than polysaccharides, such as extraction of juice or oil, and has not been subjected to substantial drying or degradation, such as microbial or in situ enzymatic degradation.

Prior to treating with a preserving composition, the biomass material may be comminuted by chopping, cutting, grinding, or other means. According to certain embodiments, the biomass material may be cut to an average particle size in the range from about 10 mm to about 30 mm, the particle size being determined by measuring the largest dimension of the particle.

According to certain embodiments, the preserving composition comprises alcohol, and suitable alcohols include but are not limited to ethanol, isopropanol, and combinations thereof. According to certain embodiments, the degree of preservation imparted to the biomass material can be affected by several parameters including the concentration of alcohol in the preserving composition, the amount of time the preserving composition contacts the biomass material, and the amount of preserving composition per unit weight of biomass material when contacting the preserving composition to the biomass material. According to certain embodiments, the alcohol is present in the preserving composition in an amount, the biomass material is contacted with the preserving composition in an amount, and the biomass material is contacted with the preserving composition for a time suitable for establishing an equilibrium concentration of the alcohol in the preserving composition in an amount from about 20% to about 40% by weight of the preserving composition. The equilibrium concentration of alcohol in the preserving composition is the amount of alcohol in the preserving composition by weight of the preserving composition when the absorption of alcohol into the biomass material from the preserving composition contacting the biomass material substantially ceases and the amount of alcohol in the preserving composition remains substantially constant.

According to certain embodiments, alcohol is present in the preserving composition in an amount from about 40 to about 100% by weight of the preserving composition, or from about 40 to about 96% by weight of the preserving composition, or from about 50 to about 96% by weight of the preserving composition, or from about 40 to about 75% by weight of the preserving composition, or from about 50 to about 70% by weight of the preserving composition. According to certain embodiments, the preserving composition may also include water in addition to alcohol, and in some embodiments, water constitutes all or substantially the remainder of the preserving composition in addition to the alcohol.

According to certain embodiments, the biomass material is contacted with the preserving composition such that the preserving composition is in an amount of at least about 40% by weight of the biomass material, or at least about 50% by weight of the biomass material, or at least about 60% by weight of the biomass material, or at least about 70% by weight of the biomass material. According to some embodiments, the biomass material is contacted with the preserving composition in an amount from about 40% to about 160% by weight of the biomass material, or from about 50% to about 160% by weight of the biomass material, or from about 50% to about 100% by weight of the biomass material.

According to certain embodiments, the contacting step comprises contacting the biomass material with the preserving composition for a period from about 45 seconds to about 15 days, or from about 45 seconds to about 10 minutes, or from about 1 minute to about 5 minutes.

According to certain embodiments, the contacting step comprises submerging the biomass material in the preserving composition, dipping the biomass material in the preserving composition, or spraying the biomass material with preserving composition.

According to certain embodiments, the storing step comprises storing the preserved biomass material for at least about 24 hours, or at least about 3 days, or at least about 7 days, or at least about 15 days, or at least about 30 days, or at least about 3 months. "Storing the preserved biomass material" as used herein means keeping the preserved biomass material for future use such as extraction of polysaccharide therefrom.

According to certain embodiments, the method of preserving biomass material may further comprise draining at least a portion of the preserving composition from the biomass material after the contacting step. In some embodiments, the portion of the preserving composition unabsorbed by the preserved biomass material is substantially entirely drained from the preserved biomass material. In some embodiments, the step of storing the preserved biomass material may include transporting the preserved biomass material to a location remote from a location where the biomass material is treated with the preserving composition. Draining the portion of the preserving composition unabsorbed by the preserved biomass material before storing or transporting the preserved biomass material reduces the weight of the material being stored or transported and reduces the cost of storing and transporting the preserved biomass material. Draining the portion of the preserving composition unabsorbed by the preserved biomass material also reduces the overall alcohol content of the preserved biomass material and reduces the likelihood of the preserved biomass material being a fire hazard.

If desired, in accordance with some embodiments, the biomass material may be dewatered in accordance with the method disclosed in pending U.S. patent application Ser. No. 12/510,478 filed Jul. 28, 2009, now U.S. Patent No. 8,323,513, entitled Dewatering Biomass Material Comprising Polysaccharide, Method for Extracting Polysaccharide From Biomass Material, and Dewatered Biomass Material, the disclosure of which is expressly incorporated by reference herein in its entirety.

As explained above, in some embodiments, at least a substantial portion of the polysaccharide in the preserved biomass material may be extracted and the resulting extracted polysaccharide has properties comparable or even superior to polysaccharide extracted from fresh biomass material. The polysaccharide material, such as pectin, may be extracted from the preserved biomass material by conventional means. In addition to pectin, other extractable polysaccharides include but are not limited to carrageenan, agar, alginate and the like.

According to some embodiments, relative to pectin extracted from fresh non-preserved citrus peel, pectin yield is substantially increased, degree of esterification (DE) is comparable to marginally increased, intrinsic viscosity is marginally to substantially increased, and the USA-SAG grade is considerably increased when pectin is extracted from citrus peel treated with an alcohol containing preserving composition. According to certain embodiments, when fresh non-preserved citrus peel is contacted with a preserving composition comprising alcohol, the pectin yield is increased by at least about 10%, at least about 20%, at least about 30%, at least about 50%, at least about 100%, at least about 200%, or from about 10% to about 230% as compared to unstored, fresh non-preserved fresh peel. In addition, according to certain embodiments, when fresh non-preserved citrus peel is contacted with a preserving composition comprising alcohol, the DE of the resulting pectin is increased by at least about 3%, at least about 5%, at least about 7%, at least about 20%, or from about 3% to about 24% as compared to unstored, fresh non-preserved fresh peel. Furthermore, according to certain embodiments, when fresh non-preserved citrus peel is contacted with a preserving composition comprising alcohol, the intrinsic viscosity of the resulting pectin is increased by at least about 3%, at least about 20%, at least about 45%, at least about 150%, or from about 3% to about 160% as compared to unstored, fresh non-preserved fresh peel. Furthermore, according to certain embodiments, when fresh non-preserved citrus peel is contacted with a preserving composition comprising alcohol, the USA-SAG grade of the resulting pectin is increased by at least about 5%, at least about 9%, or from about 5% to about 9% as compared to unstored, fresh non-preserved fresh peel.

EXAMPLES

The present invention is further illustrated by the following examples, which are not to be construed in any way as imparting limitations upon the scope thereof. On the contrary, it is to be clearly understood that resort may be had to various other embodiments, modifications, and equivalents thereof which, after reading the description therein, may suggest themselves to those skilled in the art without departing from the scope of the appended claims. Unless otherwise specified, %'s are by weight.

Treatment, Extraction, and Test Procedures

Procedures used to make and evaluate samples from the Examples described below were as follows:

Treatment of Peel

Apparatus
1. Potato peeler
2. Glass beakers—1000 ml, 2000 ml
3. Hand held juicer
4. Spraying flask Materials
1. Fresh oranges purchased in the local super market
2. Demineralized water
3. 96% ethanol
4. 100% iso propanol
5. 10% nitric acid Procedure
1. The flavedo of the fruit was peel off
2. The fruit was juiced
3. The juiced fruit was cut into small cubes of about 5 mm
4. The cut fruit pieces were treated in different ways.
5. The treated fruit pieces were dried over night at about 68° C.

Extraction of Pectin

Apparatus
1. Glass beaker—2000 ml
2. Büchner funnel
3. Stirrer with propeller stirrer, Eurostar digital, IKA Werke
4. Nylon cloth Chemicals
1. Demineralized water
2. 62% nitric acid
3. Diatomaceous earth
4. Ion exchange resin, Amberlite SR1L, produced by Rohm&Haas
5. 100% iso propanol
6. 60% iso propanol Procedure
1. About 900 ml demineralised water was heated to 70° C. in a glass beaker equipped with a stirrer and temperature control
2. About 20 g dry peel was added to the water, and the pH is adjusted to 1.7-1.8 by addition of 62% nitric acid.
3. Extraction was carried out at 70° C. for 5 hours while stirring.
4. After extraction, the content of the vessel was filtered on a Bücher funnel using diatomaceous earth as filter aid previously rinsed with a mixture of 10 ml 62% nitric acid and 500 ml demineralised water.
5. The filtered extract was ion exchanged while stirring by adding about 50 ml resin (Amberlite SR1L, produced by Rohm&Haas) per litre of filtered extract. While stirring, the ion exchange was carried out during 20 minutes while stirring.
6. The ion exchanged filtrate was filtered on a Bücher funnel equipped with a cloth.
7. The filtered ion exchanged filtrate was precipitated by adding it to three parts of 100% isopropanol while stirring gently.
8. The precipitate was collected on nylon cloth and pressed by hand to remove as much isopropanol as possible.
9. The hand pressed precipitate was washed once in 60% isopropanol and then dried at about 68° C. in a drying cabinet at atmospheric pressure.
10. After drying, the pectin was milled.

Determination of Degree of Esterification (DE) and Galacturonic Acid (GA) in Non-Amide Pectin Apparatus:
1. Analytical balance
2. Glass beaker, 250 ml, 5 pieces
3. Measuring glass, 100 ml
4. Vacuum pump
5. Suction flask
6. Glass filter crucible no. 1 (Büchner funnel and filter paper)
7. Stop watch
8. Test tube
9. Drying cabinet at 105*C
10. Desiccator
11. Magnetic stirrer and magnets
12. Burette (10 ml, accuracy ±0.05 ml)
13. Pipettes (20 ml: 2 pieces, 10 ml: 1 piece)
14. pH-meter/auto burette or phenolphthalein Chemicals:
1. Carbon dioxide-free water (deionized water)
2. Isopropanol (IPA), 60% and 100%
3. Hydrochloride (HCl), 0.5 N and fuming 37%
4. Sodium hydroxide (NaOH), 0.1 N (corrected to four decimals, e.g. 0.1002), 0.5 N
5. Silver nitrate ($AgNO_3$), 0.1 N
6. Nitric acid ($HNO_3$), 3 N
7. Indicator, phenolphthalein, 0.1%

Procedure—Determination of % DE and % GA (Acid Alcohol: 100 ml 60% IPA +5 ml HCl Fuming 37%):
1. Weigh 2.0000 g pectin in a 250 ml glass beaker.
2. Add 100 ml acid alcohol and stir on a magnetic stirrer for 10 min.
3. Filtrate through a dried, weighed glass filter crucible.
4. Rinse the beaker completely with 6×15 ml acid alcohol.
5. Wash with 60% IPA until the filtrate is chloride-free* (approximately 500 ml).
6. Wash with 20 ml 100% IPA.
7. Dry the sample for 2½ hours at 105° C.
8. Weigh the crucible after drying and cooling in desiccator.
9. Weigh accurately 0.4000 g of the sample in a 250 ml glass beaker.

10. Weigh two samples for double determination. Deviation between double determinations must max. be 1.5% absolute. If deviation exceeds 1.5% the test must be repeated.

11. Wet the pectin with approx. 2 ml 100% IPA and add approx. 100 ml carbon dioxide-free, deionized water while stirring on a magnetic stirrer.

*(Chloride Test: Transfer Approximately 10 ml Filtrate to a Test Tube, Add Approximately 3 ml 3 N $HNO_3$, and Add a Few Drops of $AgNO_3$. The Filtrate Will be Chloride-Free if the Solution is Clear, Otherwise There Will be a Precipitation of Silver Chloride.)

The sample is now ready for titration, either by means of an indicator or by using a pH-meter/auto burette.

Procedure—Determination of % DE Only
(Acid Alcohol: 100 ml 60% IPA +5 ml HCl Fuming 37%):
 1. Weigh 2.00 g pectin in a 250 ml glass beaker.
 2. Add 100 ml acid alcohol and stir on a magnetic stirrer for 10 min.
 3. Filtrate through a Büchner funnel with filter paper.
 4. Rinse the beaker with 90 ml acid alcohol.
 5. Wash with 1000 ml 60% IPA.
 6. Wash with approximately 30 ml 100% IPA.
 7. Dry the sample for approximately 15 min. on Büchner funnel with vacuum suction.
 8. Weigh approximately 0.40 g of the sample in a 250 ml glass beaker.
 9. Weigh two samples for double determination. Deviation between double determinations must max. be 1.5% absolute. If deviation exceeds 1.5% the test must be repeated.
 10. Wet the pectin with approximately 2 ml 100% IPA and add approx. 100 ml deionized water while stirring on a magnetic stirrer.

The sample is now ready for titration, either by means of an indicator or by using a pH-meter/auto burette.

Note: It is very important that samples with % DE<10% are titrated very slowly, as the sample will only dissolve slowly during titration.

Titration Using Indicator:
 1. Add 5 drops of phenolphthalein indicator and titrate with 0.1 N NaOH until change of color (record it as V1 titer).
 2. Add 20.00 ml 0.5 N NaOH while stirring. Let stand for exactly 15 min. When standing the sample must be covered with foil.
 3. Add 20.00 ml 0.5 N HCl while stirring and stir until the color disappears.
 4. Add 3 drops of phenolphthalein and titrate with 0.1 N NaOH until change of color (record it as V2 titer).

Blind Test (Double Determination is Carried Out):
Add 5 drops phenolphthalein to 100 ml carbon dioxide-free or dionized water (same type as used for the sample), and titrate in a 250 ml glass beaker with 0.1 N NaOH until change of color (1-2 drops).

Add 20.00 ml 0.5 N NaOH and let the sample stand untouched for exactly 15 minutes. When standing the sample must be covered with foil.

Add 20.00 ml 0.5 N HCl and 3 drops phenolphthalein, and titrate until change of color with 0.1 N NaOH (record it as B1). Maximum amount allowed for titration is 1 ml 0.1 N NaOH. If titrating with more than 1 ml, 0.5 N HCl must be diluted with a small amount of deionized water. If the sample has shown change of color on addition of 0.5 N HCl, 0.5 N NaOH must be diluted with a small amount of carbon dioxide-free water. Maximum allowed dilution with water is such that the solutions are between 0.52 and 0.48 N.

Titration Using pH-Meter/Auto Burette:
Using Auto burette type ABU 80 the following settings may be applied:

| Sample with | % DE < 10 | Blind test |
|---|---|---|
| Proportional band | 0.5 | 5 |
| Delay sec. | 50 | 5 |
| Speed—V1 | 10 | 5 |
| Speed—V2 | 15 | 5 |

1. Titrate with 0.1 N NaOH to pH 8.5 (record the result as V1 titer).
2. Add 20.00 ml 0.5 N NaOH while stirring, and let the sample stand without stirring for exactly 3.15 minutes. When standing the sample must be covered with foil.
4. Add 20.00 ml 0.5 N HCl while stirring and stir until pH is constant.
5. Subsequently, titrate with 0.1 N NaOH to pH 8.5 (record the result as V2 titer).

Blind Test (Double Determination is Carried Out):
 1. Titrate 100 ml carbon dioxide-free or deionized (same type as used for the sample) water to pH 8.5 with 0.1 N NaOH (1-2 drops).
 2. Add 20.00 ml 0.5 N NaOH while stirring and let the blind test sample stand without stirring for exactly 15 min. When standing the sample must be covered with foil.
 3. Add 20.00 ml 0.5 N HCl while stirring, and stir until pH is constant.
 4. Titrate to pH 8.5 with 0.1 N NaOH (record it as B1). Maximum amount allowed for titration is 1 ml 0.1 N NaOH. If titrating with more than 1 ml, 0.5 N HCl must be diluted with a small amount of deionized water. If pH does not fall to below 8.5 on addition of 0.5 N HCl, 0.5 N NaOH must be diluted with a small amount of carbon dioxide-free water. Maximum allowed dilution with water is such that the dilutions are between 0.52 and 0.48 N.

Calculation:

$$V_t = V_1 + (V_2 - B_1)$$

% DE (Degree of Esterification) = $\{(V_2 - B_1) \times 100\} / V_t$

% DFA (Degree of Free Acid) = 100 − % DE

% GA* (Degree of Galacturonic acid) = $(194.1 \times V_t \times N \times 100)/400$

*On ash- and moisture-free basis
 194.1: Molecular weight for GA
 N: Corrected normality for 0.1 N NaOH used for titration (e.g. 0.1002 N)
 400: weight in mg of washed and dried sample for titration % Pure pectin = {(acid washed, dried amount of pectin) × 100}/(weighed amount of pectin)

Determination of Residual Sugar in Peels
Apparatus
 1. Glass beaker, 400 ml
 2. Balance (accuracy 0.2 g)
 3. Magnet stirrer
 4. Magnet
 5. Paper filters (coarse) e.g. type AGF 614
 6. Drying cabinet at 65-70° C.
 7. Büchner funnel
 8. Vacuum pump
Solutions
 1. Isopropanol 50%

Procedure
1. Weigh out about 3 g dry peel in a glass beaker.
2. Add 100 ml 50% isopropanol.
3. Stir for 4 hours on magnet stirrer and filter.
4. Wash the filtrate with 250 ml 50% isopropanol.
5. Place filter and filtrate in drying cabinet at 65-70° C. overnight and determine weight of filtrate.

Calculate the Residual Sugar in Peels:

(Weight of dry peel−weight of dry, washed peel)×100/weight of dry peel

Determination of Molecular Weight, Intrinsic Viscosity and Molecular Weight Distribution in Pectin Based on Orange, Lime and Lemon.

The molecules are separated according to their size by gel permeation chromatography Size Exclusion Chromatography. The effluent from the chromatography column passes three detectors, Refractive Index (RI), Right Angle Laser Light Scattering (RALLS) and a viscosity detector (DP). The Viscotek software converts the detector signals to molecular weight and intrinsic viscosity and calculates weighted averages for the entire population.

Principle

The analyses are performed using SEC (Size Exclusion Chromatography).

The principle by SEC is that the molecules are separated on basis of size, the larger molecules eludes first then the smaller molecules, then salts.

Analysis conditions
Viscotek Tri-Sec instrument
Viscotek pump VE 1121 GPC pump
Degasser
Auto sampler AS3500 with Sample prep. module, Thermo Separation Products
Column oven for 3 columns, STH 585 (40° C.)
3 TSK Columns GMPWXL, from Supelco and a guard column.
RALLS detector, Right Angle Laser Light Scattering Detector LD 600
Dual Detector, RI Detector, Refractive Index and Viscometer Detector, Module 250
Data manager, acquisition unit
Computer, Tri-Sec software
Solvent: 0.3 M Li-acetate buffer pH 4.8.
Flow : 1.0 ml/min
Pectin conc. : Approximately 1 mg/ml
Temperature : 40° C.
Injection volume : 100 µl Full loop.

Analysis time for one run is 50 minutes, to test a sample always make two runs and compare them. If there is more than 10 percent deviation (% STDV) between the Mw results, two new runs must be made.

Sample preparation
Manual sample preparation:
Samples known to contain non-soluble material must be manually dissolved and filtrated
(0.45 µm filter) prior to injection.
1. 40.0 mg sample is weighed out into a 100 ml Blue Cap bottle.
2. A magnet and 100 ml ethanol are added.
3. The sample is placed at a magnetic stirrer including a 75° C. water bath or Block heater.
4. While gently stirring 40 ml of solvent is added.
5. The bottle cap is closed and the sample is stirred gently at 75° C. for 30 min.
6. The sample is cooled in an approx. 20° C. water bath until room temperature is reached.

Sample preparation using auto sampler AS3500:
Weigh out approx. 1.5 mg pectin in an auto sampler vial. This is placed in the auto sampler rack. Use template 4 from the AS3500 auto sampler. The following units in the auto sampler are used:
Dilution cycles: 3
Heater: ON Temp: 70° C.
1—Load 20 µl solvent S-1 (S-1=96% ethanol)
5—Add 10 µl to sample
11—Load 1500 µl solvent S-2 (S-2=0.3 M Li-acetate buffer)
15—Add 1300 µl to sample (0.1% pectin solution—1 mg/ml)
16—Mix for 9.9 minute
18—Mix for 9.9 minutes
19—wait for 5.0 min.
Enable Overlay: YES (starts the next sample preparation before end of analysis for running sample)
Run time at the auto sampler is set at 50 min or more. 100 ml full loop injection is used. When the auto sampler is used the sample is automatically filtrated by a 0.5 mm in-line filter placed after the auto sampler loop.

Control Samples
As control sample use a Dextran with the molecular weight 70,000 Daltons, concentration about 3.0 mg/ml and a pectin sample with a known Mw. In addition the RI detector, the recovery, must be controlled with a pectin solution with a known concentration. For daily control use the Dextran standard. For weekly control use the pectin sample. For monthly control of the recovery use the pectin solution.

Calibration
Dextran T 70 Mw 70,000 and Pullulan Mw 212,000 are used for calibration. Calibration is only performed by a Viscotek supervisor Registration
For registration of instrument-data there is a logbook that contains data about: Purging, flow, pump pressure, oven temperature, detector signals, bridge balance and recovery.
Eluent preparation 1 L
30,603 g Lithium acetate dihydrate M=102.01
17,157 ml (18.02 g) 100% acetic acid
MilliQ-water up to 1 L
0.25 g Sodiumazid for preservation
Ultra filtration 0.2µ after dissolution
All chemicals must be analytical grade.

Approval Criterion
To test a sample always make double determination and compare results. If there is more than 10 percent deviation (% STDV) between the Mw results, a new double determination must be made.
For pectin standards the approval criterion is 10 percent (% STDV) at the Mw result.
For Dextran 70,000 Daltons the approval criterion is 5 percent deviation to the standard
molecular weight at the Mw result.

Determination of the USA SAG-Degree of High Ester Pectin
Principle:
The USA SAG degree method is a method, which expresses directly the sugar binding capacity of the pectin. The method assumes a gel containing 65% soluble solids at a pH of 2.2-2.4, and that this gel sags 23.5%. The method requires that a range of gels are made containing different concentrations of pectin. For a gel, which fulfils the requirements, the ratio between pectin and sugar is calculated. If this ratio is 1:150, the pectin is 150 degrees USA SAG.

Apparatus:
1. Analytical balance
2. Laboratory scale (max. load 3-5 kg, accuracy 0.2 g)
3. Stainless steel saucepan, 1.5 l, 15 cm diameter
4. Electric hotplate, 15 cm diameter, 1500 W
5. Stirrer motor, adjustable speed, 500-1000 rpm
6. Stirrer shaft (HETO, article No. 000240, drawing No. 0004259)
7. Beakers (1000 ml and 150 ml)
8. Spatula
9. Stop watch
10. Thermometer, 100 degree C.
11. pH-meter
12. SAG-glasses and tape
13. Ridgelimeter
14. Wire cheese slicer
15. Refractometer
16. Incubator Chemicals: Sugar and Tartaric acid (488 g per liter solution).

Deionized Water Preparation of Jelly:
1. Weigh into 1000 ml beaker 650/(650−x) g sugar, (x=assumed firmness of pectin).
2. Transfer 20-30 g of the weighed sugar into a dry 150 ml beaker and add the weighed pectin sample (the weight of pectin to use in a jelly is expressed as: 650 g/assumed grade).
3. Mix pectin and sugar thoroughly in the beaker by stirring with spatula.
4. Pour 410 ml deionized/distilled water into the 1500 ml tarred, stainless steel saucepan and place stirrer shaft in it. Pour pectin/sugar mixture into water—all at once—while stirring at 1000 rpm. Continue stirring for two minutes. (It is important as quickly as possible to submerge the pectin/sugar solution in the water and to transfer any traces of pectin/sugar in the small beaker to the saucepan).
5. After 2 minutes, place saucepan on preheated electric hotplate, and stir at 500 rpm.
6. When contents reach a full rolling boil, add remaining sugar and continue heating and stirring until sugar is dissolved and until net weight of the jelly batch is 1015 g.
7. The electric hotplate should be set so that the entire heating time for the jelly is 5-8 minutes (full load, 1500 W).
8. After weighing the 1015 g batch on the laboratory scale, leave it undisturbed on the table for one minute. Then tip the saucepan, so that the contents are just about to overflow, and quickly skim off any foam. Place thermometer in the batch and continue stirring gently until the temperature reaches exactly 95 degree C.
9. Quickly pour the batch into two previously prepared SAG glasses each containing 1.75-2.25 ml of tartaric acid solution and equipped with adhesive tape allowing filling to approximately 1 cm above the brims.
10. After 15 minutes, cover the glasses with lids, and when the temperature reaches 30-35 degree C., place the glasses in an incubator at 25+−3 degree C. for 20-24 hours.

Measuring:
1. After 20-24 hours' storage of the jellies, remove lids from glasses and remove tape. Using a wire cheese slicer, cut off the top layer and discard.
2. Then carefully turn the jelly out of the glass to an inverted position on a square glass plate furnished with Ridgelimeter.
3. Start stop watch once the jelly is on the glass plate. If the jelly leans slightly to one side this can usually be corrected by gently tilting the glass plate in the other direction.
4. Place plate and jelly carefully on the base of the Ridgelimeter so that the jelly is centered under the micrometer screw, which should then be screwed down near to the surface of the jelly.
5. Two minutes after the stop watch was started, bring the point of the micrometer screw into contact with the jelly surface and record the Ridgelimeter reading to the nearest 0.1.
6. Measure pH if the SAG gel is loose or atypical by visual inspection or handling. pH must be between 2.2 and 2.4. Otherwise, the sample must be retested.

Calculation of Jelly Grade of the Pectin:
1. Using the Ridgelimeter calibration table, convert the Ridgelimeter reading to a Factor 1.
2. Using the soluble solids correcting table, the soluble solids measured is converted into a Factor 2.
3. When multiplying the assumed grade of the test by the correction factors, the true grade is obtained:

Assumed grade×Factor 1×Factor 2=true grade

Correlation Values Calculated for "Exchanged" SAG Analysis

| Ridgelimeter reading percent SAG | Factor 1 |
|---|---|
| 19.0 | 1.200 |
| 19.1 | 1.195 |
| 19.2 | 1.190 |
| 19.3 | 1.186 |
| 19.4 | 1.182 |
| 19.5 | 1.177 |
| 19.6 | 1.173 |
| 19.7 | 1.168 |
| 19.8 | 1.163 |
| 19.9 | 1.158 |
| 20.0 | 1.155 |
| 20.1 | 1.150 |
| 20.2 | 1.146 |
| 20.3 | 1.142 |
| 20.4 | 1.137 |
| 20.5 | 1.133 |
| 20.6 | 1.128 |
| 20.7 | 1.124 |
| 20.8 | 1.120 |
| 20.9 | 1.115 |
| 21.0 | 1.110 |
| 21.1 | 1.107 |
| 21.2 | 1.102 |
| 21.3 | 1.097 |
| 21.4 | 1.093 |
| 21.5 | 1.088 |
| 21.6 | 1.084 |
| 21.7 | 1.080 |
| 21.8 | 1.076 |
| 21.9 | 1.072 |
| 22.0 | 1.067 |
| 22.1 | 1.062 |
| 22.2 | 1.057 |
| 22.3 | 1.054 |
| 22.4 | 1.048 |
| 22.5 | 1.044 |
| 22.6 | 1.040 |
| 22.7 | 1.035 |
| 22.8 | 1.031 |
| 22.9 | 1.027 |
| 23.0 | 1.022 |
| 23.1 | 1.018 |
| 23.2 | 1.013 |
| 23.3 | 1.009 |
| 23.4 | 1.005 |
| 23.5 | 1.000 |
| 23.6 | 0.997 |
| 23.7 | 0.992 |

| Ridgelimeter reading percent SAG | Factor 1 |
|---|---|
| 23.8 | 0.987 |
| 23.9 | 0.983 |
| 24.0 | 0.978 |
| 24.1 | 0.974 |
| 24.2 | 0.969 |
| 24.3 | 0.965 |
| 24.4 | 0.960 |
| 24.5 | 0.957 |
| 24.6 | 0.953 |
| 24.7 | 0.948 |
| 24.8 | 0.944 |
| 24.9 | 0.940 |
| 25.0 | 0.936 |
| 25.1 | 0.933 |
| 25.2 | 0.928 |
| 25.3 | 0.925 |
| 25.4 | 0.921 |
| 25.5 | 0.917 |
| 25.6 | 0.913 |
| 25.7 | 0.910 |
| 25.8 | 0.906 |
| 25.9 | 0.902 |
| 26.0 | 0.898 |
| 26.1 | 0.895 |
| 26.2 | 0.892 |
| 26.3 | 0.888 |
| 26.4 | 0.885 |
| 26.5 | 0.881 |
| 26.6 | 0.878 |
| 26.7 | 0.875 |
| 26.8 | 0.872 |
| 26.9 | 0.868 |
| 27.0 | 0.864 |
| 27.1 | 0.862 |
| 27.2 | 0.859 |
| 27.3 | 0.856 |
| 27.4 | 0.853 |
| 27.5 | 0.850 |
| 27.6 | 0.847 |
| 27.7 | 0.844 |
| 27.8 | 0.842 |
| 27.9 | 0.838 |

| Soluble Solids Correcting Table | |
|---|---|
| Percent Soluble Solids | Correction Factor 2 |
| 64.0 | 1.034 |
| 64.1 | 1.031 |
| 64.2 | 1.028 |
| 64.3 | 1.024 |
| 64.4 | 1.021 |
| 64.5 | 1.018 |
| 64.6 | 1.015 |
| 64.7 | 1.012 |
| 64.8 | 1.008 |
| 64.9 | 1.004 |
| 65.0 | 1.000 |
| 65.1 | 0.997 |
| 65.2 | 0.993 |
| 65.3 | 0.990 |
| 65.4 | 0.987 |
| 65.5 | 0.984 |
| 65.6 | 0.980 |
| 65.7 | 0.975 |
| 65.8 | 0.970 |
| 65.9 | 0.967 |
| 66.0 | 0.964 |
| 66.1 | 0.960 |
| 66.2 | 0.957 |

EXAMPLE 1

Effect of Ethanol

In this Example 1, the effect of covering the fresh orange peel with ethanol was undertaken.

TABLE 1A

Effect of Ethanol

| Sample No. | Treatment of fresh peel | Peel g | Peel Dry g | Peel Dry Matter % | Residual Sugar % | Pectin Yield % | Pectin DE % | Pectin GA % | Pectin Mw Dalton | Pectin Intrinsic Viscosity dl/g |
|---|---|---|---|---|---|---|---|---|---|---|
| 59 | No treatment, no storage | 230 | 42.80 | 18.61 | 46.99 | 8.33 | 64.4 | 76.3 | 233.137 | 3.22 |
| 61 | No treatment, stored 3 days in exicator | 230 | 39.08 | 16.99 | 37.76 | 7.26 | 50.1 | 72.6 | 161.652 | 1.86 |
| 62 | Covered with 600 ml 96% EtOH, stored 3 days covered | 230 | 21.12 | 9.18 | 23.60 | 16.52 | 68.9 | 77.6 | 295.167 | 4.77 |

TABLE 1B

Effect of Ethanol

| Sample No. | Treatment of Fresh Peel | Peel With no Sugar g | Pectin Yield No Sugar % |
|---|---|---|---|
| 59 | No treatment, no storage | 19.87 | 15.71 |
| 61 | No treatment, stored 3 days in exicator | 21.28 | 11.66 |
| 62 | Covered with 600 ml 96% EtOH, stored 3 days covered | 15.97 | 21.62 |

When the fresh orange peel was covered with ethanol in Example 1, shrinking of the peel was evident. The data in Tables 1A and 1B reveals that covering fresh peel with ethanol resulted in a substantial increase in pectin yield even when residual sugar is taken into account.

This is a calculation based on the residual sugar measured of the peel after washing with ethanol.

Thus, when non-preserved fresh peel was stored for three days at 25° C., the pectin yield was reduced by about 25% as compared with the yield from fresh peel extracted immediately. However, when the fresh peel was covered with 96% ethanol and stored three days at 25° C., the pectin yield was increased by about 38% as compared to non stored fresh peel. In addition, this data shows that when fresh peel was stored for three days, the DE of the resulting pectin was substantially reduced. Covering the peel with ethanol provided for a higher DE of the resulting pectin than was the case with the pectin from fresh, non-preserved and un-stored peel. Thus, even though fresh peel was extracted immediately, some de-esterification took place during the extraction procedure. Furthermore, this data also shows that storing fresh peel resulted in a loss in intrinsic viscosity of about 50%, which translated to a loss of molecular weight of about 50%. When covering fresh peel with ethanol, the intrinsic viscosity increased by about 50% compared to the non-preserved and un-stored fresh peel. Thus, alcohol had a dramatic impact on maintaining the molecular weight of the resulting pectin. Consequently, is was not just the DE of the pectin, which could be maintained with ethanol, but also the molecular weight, which may be due to other enzymes acting apart from esterases. So, when fresh peel was covered with 96% ethanol, the pectin yield substantially increased, the DE marginally increased, and the intrinsic viscosity substantially increased. These results may be explained as due to effective preservation of the pectin in the fresh peel when the fresh peel is covered with 96% ethanol.

EXAMPLE 2

Treatment with Microbial Preservative

In this Example 2, sodium azide was used to distinguish the microbial effect from the peel enzyme effect. For this, a new batch of fresh oranges were used and treated with different liquids. After each treatment, the peel was washed once with the same liquid, but fresh.

TABLE 2A

Treatment with Microbial Preservative

| Sample No. | Treatment of fresh peel | Peel g | Peel Dry g | Peel Dry Matter % | Residual Sugar % | Pectin Yield % | Pectin DE % | Pectin GA % | Pectin Mw Dalton | Pectin Intrinsic Viscosity dl/g |
|---|---|---|---|---|---|---|---|---|---|---|
| 65 | No treatment, no storage | 280 | 55.68 | 19.89 | 36.10 | 8.21 | 70.4 | 71.4 | 428.177 | 5.80 |
| 66 | 600 ml water + 0.06 g Na-azid stored 7 days, rinsed with 500 ml water | 280 | 31.95 | 11.41 | 25.11 | 7.88 | 70.0 | 73.7 | 387.593 | 5.11 |
| 67 | 600 ml 35% EtOH + 0.06 g Na-azid stored 7 days, rinsed with 500 ml 35% EtOH | 280 | 32.87 | 11.74 | 26.10 | 10.34 | 69.3 | 74.5 | 368.094 | 5.35 |
| 68 | 600 ml 50% EtOH + 0.06 g Na-azid stored 7 days, rinsed with 500 ml 50% EtOH | 280 | 34.43 | 12.30 | 22.31 | 12.43 | 70.6 | 70.5 | 393.627 | 5.82 |
| 69 | 600 ml 70% EtOH + 0.06 g Na-azid stored 7 days, rinsed with 500 ml 70% EtOH | 280 | 32.56 | 11.63 | 21.38 | 14.15 | 73.1 | 73.1 | 406.505 | 6.01 |
| 70 | 600 ml 96% EtOH + 0.06 g Na-azid stored 7 days, rinsed with 500 ml 96% EtOH | 280 | 33.81 | 12.08 | 21.71 | 11.36 | 73.5 | 71.2 | 388.436 | 5.92 |

TABLE 2B

Treatment with Microbial Preservative

| Sample No. | Treatment of Fresh Peel | Peel With no Sugar g | Pectin Yield No Sugar % |
|---|---|---|---|
| 65 | No treatment, no storage | 30.6 | 12.85 |
| 66 | 600 ml water + 0.06 g Na-azid stored 7 days, rinsed with 500 ml water | 20.4 | 10.52 |
| 67 | 600 ml 35% EtOH + 0.06 g Na-azid stored 7 days, rinsed with 500 ml 35% EtOH | 20.8 | 13.99 |
| 68 | 600 ml 50% EtOH + 0.06 g Na-azid stored 7 days, rinsed with 500 ml 50% EtOH | 22.6 | 15.99 |
| 69 | 600 ml 70% EtOH + 0.06 g Na-azid stored 7 days, rinsed with 500 ml 70% EtOH | 21.8 | 17.99 |
| 70 | 600 ml 96% EtOH + 0.06 g Na-azid stored 7 days, rinsed with 500 ml 96% EtOH | 22.7 | 14.51 |

It was noted that shrinking of the fresh orange peel treated in Example 2 was evident when covering the fresh peel with 96% ethanol. In addition, the fresh peel got very tough. With 70% ethanol, some shrinking took place, but the peel did not get tough. With lower ethanol strengths, the fresh peel did not shrink and did not get tough.

The data in Tables 2A and 2B shows that, when corrected for sugar, the pectin yield reached a maximum when the fresh peel was covered by 70% ethanol. The yield was about 70% higher than the pectin yield from fresh peel without storage and about 71% higher than the pectin yield from fresh peel having been covered with water and stored. Thus, without the effect from microorganisms, the enzymes in the fresh peel showed a dramatic reduction in pectin yield. The DE of the resulting pectin products did not show any difference. The peel enzymes did result in some reduction of the intrinsic viscosity during storage, but not dramatic. So, when no microbial action was present, pectin yield was substantially increased by submerging fresh peel in 50-70% ethanol, the DE of the resulting pectin products were comparable, and the intrinsic viscosity of the pectin products increased somewhat when the fresh peel was covered with 50-96% ethanol.

EXAMPLE 3

Effect of Optimal Conditions for Peel Pectinases

In this Example 3, azide was used to eliminate the action of microbial enzymes and conditions were made optimal for the peel pectinases to assess the effect of ethanol. Again, a new batch of oranges were used.

TABLE 3

Effect of Optimal Conditions for Peel Pectinases

| Sample No. | Treatment of fresh peel | Peel g | Peel Dry g | Peel Dry Matter % | Pectin Yield % | Pectin DE % | Pectin GA % | Pectin Mw Dalton | Pectin Intrinsic Viscosity dl/g |
|---|---|---|---|---|---|---|---|---|---|
| 75 | 600 ml water + 0.06 g Na-azid + 10 g NaCl stored 7 days, pH adjusted to 6.0 on 1. 4. and 6. day, rinsed with 1 liter 80% EtOH | 275 | 47.00 | 17.09 | 5.31 | 55.5 | 60.2 | 271.957 | 1.65 |
| 76 | 600 ml 96% EtOH + 0.06 g Na-azid + 10 g NaCl stored 7 days, pH checked on 1. 4. and 6. day, rinsed with 1 liter 80% EtOH | 300 | 60.00 | 20.00 | 17.52 | 68.9 | 76.0 | 384.108 | 4.29 |

In Example 3, the effect of the in situ enzymes was investigated under optimal condition of the enzyme, i.e. at close to neutral pH and with sodium chloride. Only the fresh orange peel stored in water and the fresh orange peel stored in 96% ethanol were used. When giving the pectinase the best conditions with salt and pH, the effect of ethanol was significant. The data in Table 3 shows that without ethanol, the yield dropped to about 5%, whereas the yield with ethanol was about 18%. Thus, when eliminating the microbial effect with azide, ethanol significantly increased the yield, which means that ethanol does inactivate the pectinases in the fresh peel. When the conditions were optimal for the pectinases in the peel, ethanol had a significant impact in maintaining the intrinsic viscosity. So, in the case where the conditions are favourable for the in situ enzymes of the fresh peel, ethanol provided for a dramatically higher yield and maintained the DE and the intrinsic viscosity

EXAMPLE 4

Effect of Smaller Amounts of Ethanol

In this experiment, a new batch of fresh orange peel was sprayed with different amounts of 96% ethanol.

TABLE 4A

Effect of Smaller Amounts of Ethanol

| Sample No. | Treatment of fresh peel | Peel g | Peel Dry g | Peel Dry Matter % | Residual Sugar % | Pectin Yield % | Pectin DE % | Pectin GA % | Pectin Mw Dalton | Pectin Intrinsic Viscosity dl/g |
|---|---|---|---|---|---|---|---|---|---|---|
| 83 | Sprayed with 15 ml 96% EtOH—stored 5 days | 300 | 65.51 | 21.84 | 38.31 | 8.09 | 69.0 | 77.5 | 359.983 | 4.53 |

TABLE 4A-continued

Effect of Smaller Amounts of Ethanol

| Sample No. | Treatment of fresh peel | Peel g | Peel Dry g | Peel Dry Matter % | Residual Sugar % | Pectin Yield % | Pectin DE % | Pectin GA % | Pectin Mw Dalton | Pectin Intrinsic Viscosity dl/g |
|---|---|---|---|---|---|---|---|---|---|---|
| 84 | Sprayed with 30 ml 96% EtOH—stored 5 days | 300 | 69.61 | 23.20 | 34.77 | 7.59 | 68.0 | 75.7 | 387.449 | 4.96 |
| 85 | Sprayed with 75 ml 96% EtOH—stored 5 days | 300 | 64.68 | 21.56 | 32.53 | 8.19 | 68.7 | 73.6 | 413.419 | 5.18 |
| 87 | Sprayed with 150 ml 96% EtOH—stored 5 days | 300 | 54.81 | 18.27 | 31.75 | 14.10 | 71.9 | 75.0 | 360.738 | 5.02 |
| 86 | Covered with 500 ml 96% EtOH—stored 5 days | 300 | 51.82 | 17.27 | 19.63 | 13.44 | 74.4 | 75.2 | 357.171 | 5.34 |

EXAMPLE 4B

Effect of Smaller Amounts of Ethanol

| Sample No. | Treatment of Fresh Peel | Peel With no Sugar g | Pectin Yield No Sugar % |
|---|---|---|---|
| 83 | Sprayed with 15 ml 96% EtOH—stored 5 days | 34.7 | 13.1 |
| 84 | Sprayed with 30 ml 96% EtOH—stored 5 days | 39.2 | 11.6 |
| 85 | Sprayed with 75 ml 96% EtOH—stored 5 days | 37.2 | 12.1 |
| 87 | Sprayed with 150 ml 96% EtOH—stored 5 days | 33.1 | 20.7 |
| 86 | Covered with 500 ml 96% EtOH—stored 5 days | 37.3 | 16.7 |

The data in Tables 4A and 4B shows the effects of smaller volumes of 96% ethanol. The treated orange peel was dried before extraction. When up to about 75 ml of 96% ethanol was sprayed onto the fresh peel, the pectin yield was low. The pectin yield increased substantially when the sprayed on volume of 96% ethanol was increased to 150 ml. The DE of the resulting pectin products was not much different and were all high, about 70%. A slight increase in intrinsic viscosity resulted when the volume of ethanol was 30 ml and higher. However, the intrinsic viscosities were still high and this may indicate that the resulting pectin products had not been substantially depolymerised. In summary, pectin yield was maintained when the amount of 96% EtOH was about 50% or higher of the amount of fresh peel, the DE of the pectin was unchanged and high when the fresh peel was treated with amounts of 96% EtOH in the range 5-160% of the amount of fresh peel, and intrinsic viscosity of the pectin was maintained high when the fresh peel was treated with amounts of 96% EtOH in the range 10-160% of the amount of fresh peel.

EXPERIMENT 5

Treatment of Fresh Peel with Large Amount of Alcohol

In this experiment, a relatively small amount of fresh peel was treated with a relatively large amount of alcohol, in this case isopropanol (IPA). The treatment lasted for 15 days in order to obtain a steady state alcohol concentration in the fresh peel. During the storage period, small samples of the alcohol were taken and measured for alcohol concentration.

TABLE 5A

Treatment of Fresh Peel With Large Amount of Alcohol

| Sample No | Treatment of fresh peel | Peel g | Peel Dry Matter % | Residual Sugar % | Pectin Yield % | Pectin DE % | Pectin GA % | Pectin Intrinsic Viscosity dl/g |
|---|---|---|---|---|---|---|---|---|
| 119 | Stored in 1200 ml 100% IPA for 15 days | 350 | 20.5 | 22.80 | 3.22 | 68.4 | 77.9 | 5.085 |
| 120 | Stored in 1200 ml 70% IPA for 15 days | 350 | 20.5 | 17.80 | 2.93 | 69.8 | 80.5 | 6.029 |
| 121 | Stored in 1200 ml 50% IPA for 15 days | 350 | 20.5 | 16.60 | 2.96 | 66.7 | 82.2 | 5.246 |
| 121-2 | Stored in 1200 ml 50% IPA for 15 days | 350 | 20.5 | 16.60 | 2.95 | 65.6 | 82.4 | 5.892 |
| 122 | Stored in 1200 ml 30% IPA for 15 days | 350 | 20.5 | 17.60 | 2.67 | 63.3 | 79.7 | 5.912 |
| 123 | Stored in 1200 ml 10% IPA for 15 days | 350 | 20.5 | 20.00 | 2.00 | 62.7 | 84.8 | 5.102 |
| 124 | Stored in 1200 ml water for 15 days | 350 | 20.5 | 19.80 | 1.18 | 56.4 | 80.2 | 2.662 |
| 125 | Peel as is—No treatment, no storage | 350 | 20.5 | 40.60 | 3.17 | 69.3 | 81.3 | 5.503 |

TABLE 5B

Alcohol Concentration During Storage

| Sample No | Treatment of peel | Storage Days | IPA % |
|---|---|---|---|
| 119 | Stored in 1200 ml 100% IPA for 15 days | 1 | 61.73 |
| | | 2 | 50.22 |
| | | 3 | 53.44 |
| | | 4 | 54.69 |
| | | 10 | 50.70 |
| | | 11 | 46.44 |
| | | 15 | 54.56 |
| 120 | Stored in 1200 ml 70% IPA for 15 days | 1 | 31.68 |
| | | 2 | 36.61 |
| | | 3 | 33.84 |
| | | 4 | 31.84 |
| | | 10 | 29.99 |
| | | 11 | 28.94 |
| | | 15 | 34.04 |
| 121 | Stored in 1200 ml 50% IPA for 15 days | 1 | 16.65 |
| | | 2 | 17.91 |
| | | 3 | 21.47 |
| | | 4 | 16.85 |
| | | 10 | 20.75 |
| | | 11 | 18.56 |
| | | 15 | 22.73 |
| 122 | Stored in 1200 ml 30% IPA for 15 days | 1 | 6.28 |
| | | 2 | 10.14 |
| | | 3 | 10.81 |
| | | 9 | 10.58 |
| | | 10 | 11.15 |
| | | 13 | 8.18 |
| | | 15 | 11.85 |
| 123 | Stored in 1200 ml 10% IPA for 15 days | 1 | 3.10 |
| | | 2 | 2.00 |
| | | 3 | 3.40 |
| | | 9 | 2.75 |
| | | 10 | 3.17 |
| | | 13 | 2.78 |
| | | 15 | 3.39 |

In Example 5, the minimum alcohol strength was sought. The data in Tables 5A and 5B show that whether being surrounded by large volumes of water or by large volumes of different strengths of alcohol, the residual sugar is basically reduced by half compared to the peel as is. Based on the data in Tables 5A and 5B, an alcohol strength at least 50% obtains a yield corresponding to the yield of the non-preserved peel. In order to preserve the DE, it appears that the alcohol strength should be at least 50%. The intrinsic viscosity of the pectin is maintained when the alcohol strength is at least 30%. Thus, Example 5 is consistent with Example 4. It appears that for the peel to be well preserved, the alcohol strength should be at least 50%, which apparently leads to a steady state alcohol concentration of about 20%.

EXPERIMENT 6

Effect of Dipping in Alcohol

In this experiment, the fresh peel was dipped in a relatively large amount of ethanol for various times. After dipping, the peel was drained and stored in air tight pouches for 7 days. Afterwards, the stored peel was extracted without being dried. The dry matter of the fresh peel was 20.47%.

TABLE 6A

Effect of Dipping in Alcohol

| Sample No | Treatment of fresh peel | Peel g | Pectin Yield % | Pectin DE % | Pectin GA % | Pectin Intrinsic Viscosity dl/g |
|---|---|---|---|---|---|---|
| 104 | Peel as is—No treatment - no storage | 300 | 2.79 | 66.4 | 80.1 | 4.445 |
| 105 | Dipped in 2000 ml 96% EtOH for 1 minute—stored for 7 days | 300 | 2.55 | 68.4 | 77.0 | 5.167 |
| 106 | Dipped in 2000 ml 96% EtOH for 10 minutes—stored for 7 days | 300 | 2.98 | 68.6 | 78.1 | 5.234 |
| 107 | Dipped in 2000 ml 96% EtOH for 60 minutes—stored for 7 days | 300 | 2.82 | 69.3 | 79.3 | 5.243 |
| 115 | Peel as is—No treatment - stored for 7 days | 300 | 1.47 | 45.2 | 76.9 | 1.455 |

Sample No. 105 was then redone with multiple washings in the same alcohol in order to investigate if the quality of the resulting pectin would last. The dipped fresh peel was stored for 15 days in air tight pouches. In addition, sample No. 105 was redone, but with a storage time of 2 months. The stored peel was extracted.

TABLE 6B

Results of Multiple Dippings and Storage For 15 Days

| Sample | Grams IPA Left after wash | Fresh Peel g | Yield % | IPA % | Peel Residual Sugar % | DE % | GA % | IV dl/g |
|---|---|---|---|---|---|---|---|---|
| Peel as is—no storage | | 300 | 16.50 | | 31.5 | 69.4 | 81.5 | 5.643 |
| Peel as is—storage for 15 days | | 300 | 9.21 | | 32.6 | 67.4 | 1.221 |
| Wash No. 1 | 1523 | 300 | 14.95 | 94.0 | | 67.5 | 82.3 | 6.034 |

TABLE 6B-continued

Results of Multiple Dippings and Storage For 15 Days

| Sample | Grams IPA Left after wash | Fresh Peel g | Yield % | IPA % | Peel Residual Sugar % | DE % | GA % | IV dl/g |
|---|---|---|---|---|---|---|---|---|
| Wash No. 2 | 1445 | 300 | | 91.4 | 31.3 | | | |
| Wash No. 3 | 1354 | 300 | 15.89 | 88.9 | | 66.5 | 83.9 | 6.066 |
| Wash No. 4 | 1277 | 300 | | 85.6 | 28.1 | | | |
| Wash No. 5 | 1187 | 300 | 16.20 | 80.0 | | 67.5 | 84.2 | 6.399 |
| Wash No. 6 | 1109 | 300 | | 75.0 | 29.5 | | | |
| Wash No. 7 | 1037 | 300 | 13.38 | 72.0 | | 67.4 | 80.3 | 6.807 |
| Wash No. 8 | 963 | 300 | | 67.7 | 29.2 | | | |
| Wash No. 9 | 886 | 300 | 14.22 | 61.7 | | 67.7 | 84.1 | 6.276 |
| Wash No. 10 | 797 | 300 | | 59.1 | 29.4 | | | |
| Wash No. 11 | 744 | 300 | 15.01 | 51.3 | | 64.4 | 81.3 | 5.758 |
| Wash No. 12 | 592 | 300 | | 47.4 | 30.3 | | | |
| Wash No. 13 | 571 | 300 | 12.96 | 43.0 | | 64.9 | 84.0 | 6.009 |
| Wash No. 14 | 501 | 300 | | 37.0 | 33.6 | | | |
| Wash No. 15 | 397 | 300 | 13.29 | 31.5 | | 63.9 | 80.2 | 5.632 |
| Test 105—storage for 2 months | | 300 | 16.80 | | | 68.3 | 82.2 | 7.071 |

In Example 6, the fresh peel was dipped in ethanol for various times. The data in Table 6A shows that dipping the fresh peel in ethanol for 1-10 minutes maintains the pectin yield after the dipped pectin was stored for 7 days. Dipping the fresh peel in ethanol for just 1 minute maintains the pectin DE even after storage of the dipped pectin for 7 days. In addition, dipping for 1 minute in ethanol at least maintains the intrinsic viscosity of the pectin.

Looking at the effect of multiple dippings for 1 minute followed by storage for 15 days, the data in Table 6B shows the IPA concentration after each dipping for 1 minute. Not surprisingly, the concentration of alcohol is reduced with the number of dipping. There is a trend towards lower pectin yield with lower alcohol concentration in the dipping alcohol. However, the yield remains pretty high compared with the unwashed peel having been stored for 15 days. With storing for 15 days, the DE of the pectin suffers a bit, but stays pretty constant with the IPA concentration. There seem to be a larger drop in DE when the concentration of IPA decreases below about 60%. However, it is a significant improvement compared to a fresh peel not being dipped in alcohol but stored for 15 days. The results of the previous test No. 105 in which the fresh peel was dipped for 1 minute in 100% IPA and then stored for 2 months instead of only 7 days shows that this dipping can, indeed, provide for a long shelf life of the fresh peel.

In summary, the data in Tables 6A and 6B show that dipping fresh peel for 1-10 minutes in 96% EtOH and storing the treated fresh peel for 15 days maintained the pectin yield, dipping fresh peel for 1 minute in 96% EtOH and storing the treated fresh peel for 15 days maintained the DE and the IV of the pectin, the concentration of alcohol in the dip-liquid was reduced linearly with the number of dippings, there was a minor decrease in pectin yield after 15 days storage with the number of dippings, the DE and the IV of the pectin suffered slightly with the number of dippings after storing for 15 days, and thus the alcohol concentration decreased. Furthermore, when dipping 1 minute in 96% EtOH and subsequently storing the dipped fresh peel for 2 months, pectin yield was identical to the pectin yield of the non-preserved and un-stored fresh peel, the DE of the pectin was slightly lower than that of the non-preserved and un-stored fresh peel, and the IV was considerably higher than that of the non-preserved and un-stored fresh peel.

EXAMPLE 7

Alcohol Wash in Pilot Plant Scale

In this Example 7, 210 kg of freshly squeezed orange peel were divided in two parts. The first part was 70 kg which were washed for 5 minutes with water, drained, stored for 7 days, dried and extracted. The second part was 140 kg which were washed for 5 minutes with 124 kg 75% ethanol, drained, stored for 7 days, dried and extracted. After alcohol wash, the wash liquid was analyzed to contain 40% ethanol.

TABLE 7

Results of Pilot Plant Test

| Sample | Storage Days | Comment | Pectin Yield % | IV dl/g | DE % | SAG |
|---|---|---|---|---|---|---|
| 1151-148-11 | 7 | Water wash | 18.4 | 4.9 | 66.7 | 212 |
| 1151-148-12 | 7 | Alcohol wash | 30.6 | 5.9 | 69.1 | 232 |

The data in Table 7 shows that with an alcohol wash, the yield remained high, whereas the water wash led to low yield. This is in line with the laboratory experiments. The alcohol wash resulted in pectin with a higher intrinsic viscosity. However, the effect was not quite as dramatic as the effect found in the laboratory tests, which may have been caused by the fact that the storage temperature in the laboratory test was around 25° C. and the storage temperature in the pilot plant test was around 15° C. The alcohol wash maintained the DE of the pectin to a higher degree than washing with water, which is in line with the laboratory tests. In addition, the alcohol wash provided for a higher SAG value of the pectin.

In summary the pilot plant tests showed that the pectin yield of alcohol washed fresh peel was considerably higher than that of water washed fresh peel, the IV of pectin from alcohol washed fresh peel was substantially higher than that of water washed fresh peel, the DE of pectin from alcohol washed fresh peel is somewhat higher than that of water washed fresh peel, and the USA-SAG grade of pectin from alcohol washed fresh peel was considerable higher that that of water washed fresh peel.

It should be understood that the foregoing relates only to the preferred embodiments of the present application and that numerous changes and modifications may be made herein without departing from the general scope of the invention as defined by the following claims and the equivalents thereof.

The invention claimed is:

1. A process for preserving biomass material comprising polysaccharide, the process comprising:
contacting the biomass material with a preserving composition to form a preserved biomass material, in which the preserving composition comprises alcohol in an amount of at least about 40% by weight of the preserved biomass material; and
storing the preserved biomass material for at least 3 days,
wherein during the storing step the preserved biomass material is in contact with the preserving composition, and
wherein the polysaccharide extracted from the preserved biomass material after the storing step has an intrinsic viscosity that is at least about 20% greater than an intrinsic viscosity of a polysaccharide extracted from a comparable non-preserved biomass material when measured at a temperature of 40° C.

2. A process as in claim 1 further comprising extracting at least one component other than polysaccharide from the biomass material before the contacting step.

3. A process as in claim 1 wherein the alcohol is in an amount from about 40% to about 96%.

4. A process as in claim 1 wherein the alcohol is in an amount from about 40% to about 75%.

5. A process as in claim 1 wherein the alcohol is in an amount from about 50% to about 70%.

6. A process as in claim 1 wherein the biomass material is contacted with the preserving composition wherein the preserving composition is in an amount from about 40% to about 160% by weight of the preserved biomass material.

7. A process as in claim 1 wherein the contacting step comprises submerging the biomass material in the preserving composition, dipping the biomass material in the preserving composition, or spraying the biomass material with preserving composition.

8. A process as in claim 1 wherein the storing step comprises storing the preserved biomass material for at least 7 days.

9. A process as in claim 1 wherein the storing step comprises storing the preserved biomass material for at least 15 days.

10. A process as in claim 2 wherein the at least one component other than polysaccharide comprises juice.

11. A process as in claim 1 further comprising comminuting the biomass material before the contacting step.

12. A process as in claim 1 further comprising, after the contacting step, draining at least a portion of the preserving composition from the preserved biomass material that was unabsorbed by the biomass material during the contacting step.

13. A process as in claim 1 wherein the biomass material is selected from the group consisting of citrus peel, apple pomace, sugar beet residue from sugar production, sun flower residue from sun flower oil production, potato residue from starch production, red seaweed, and brown seaweed.

14. A process as in claim 1 wherein the biomass material comprises orange peel.

15. A process as in claim 1 wherein the alcohol is ethanol, isopropanol, or a combination thereof.

16. A process for extracting polysaccharide from biomass material comprising polysaccharide, the process comprising:
contacting the biomass material with a preserving composition to form a preserved biomass material, in which the preserving composition comprises alcohol in an amount of at least about 40% by weight of the preserved biomass material;
storing the preserved biomass material for at least 3 days; and thereafter
extracting at least a substantial portion of the polysaccharide from the preserved biomass material,
wherein during the storing step the preserved biomass material is in contact with the preserving composition, and
wherein the polysaccharide extracted from the preserved biomass material after the storing step has an intrinsic viscosity that is at least about 20% greater than an intrinsic viscosity of a polysaccharide extracted from a comparable non-preserved biomass material when measured at a temperature of 40° C.

17. A process as in claim 16 further comprising extracting at least one component other than polysaccharide from the biomass material before the contacting step.

18. A process as in claim 16 wherein the alcohol is present in an amount from about 40% to about 96%.

19. A process as in claim 16 wherein the alcohol is present in an amount from about 40% to about 75%.

20. A process as in claim 16 wherein the alcohol is present in an amount from about 50% to about 70%.

21. A process as in claim 16 wherein the biomass material is contacted with the preserving composition wherein the preserving composition is in an amount from about 40% to about 160% by weight of the preserved biomass material.

22. A process as in claim 16 wherein the contacting step comprises submerging the biomass material in the preserving composition, dipping the biomass material in the preserving composition, or spraying the biomass material with preserving composition.

23. A process as in claim 16 wherein the storing step comprises storing the preserved biomass material for at least 7 days.

24. A process as in claim 16 wherein the storing step comprises storing the preserved biomass material for at least 15 days.

25. A process as in claim 17 wherein the at least one component other than polysaccharide comprises juice.

26. A process as in claim 16 further comprising comminuting the biomass material before the contacting step.

27. A process as in claim 16 further comprising, after the contacting step, draining at least a portion of the preserving composition from the preserved biomass material that was unabsorbed by the biomass material during the contacting step.

28. A process as in claim 16 wherein the biomass material is selected from the group consisting of citrus peel, apple pomace, sugar beet residue from sugar production, sun flower residue from sun flower oil production, potato residue from starch production, red seaweed, and brown seaweed.

29. A process as in claim 16 wherein the biomass material comprises orange peel.

30. A process as in claim 16 wherein the alcohol is ethanol, isopropanol, or a combination thereof.

31. A process as in claim 16 wherein the polysaccharide comprises pectin.

32. A process as in claim 1 wherein the polysaccharide extracted from the preserved biomass after the storing step has a USA-SAG grade that is at least 5% greater than a USA-SAG grade of the polysaccharide extracted from the comparable non-preserved biomass material.

33. A process as in claim 1 wherein the polysaccharide extracted from the preserved biomass material after the storing step has a DE that is at least 7% greater than a DE of the polysaccharide extracted from a comparable non-preserved biomass material.

34. A process as in claim 16 wherein the polysaccharide extracted from the preserved biomass after the storing step has a yield that is at least 10% greater than a yield of the polysaccharide extracted from the comparable non-preserved biomass material.

35. A process as in claim 16 wherein the polysaccharide extracted from the preserved biomass material after the storing step has a DE that is at least 7% greater than a DE of the polysaccharide extracted from a comparable non-preserved biomass material.

36. A process as in claim 16 wherein the polysaccharide extracted from the preserved biomass after the storing step has a USA-SAG grade that is at least 5% greater than a USA-SAG grade of the polysaccharide extracted from the comparable non-preserved biomass material.

37. A process as in claim 16 wherein the polysaccharide extracted from the preserved biomass after the storing step has a yield that is at least 10% greater than a yield of the polysaccharide extracted from the comparable non-preserved biomass material.

* * * * *